(12) United States Patent
Brown et al.

(10) Patent No.: US 9,145,926 B2
(45) Date of Patent: Sep. 29, 2015

(54) FRICTION CLUTCH FOR SHAFT DRIVEN ACCESSORIES

(71) Applicants: Daniel Vincent Brown, Hamden, CT (US); Rodger W. Bowman, Derby, CT (US); Yuriy Gmirya, Woodbridge, CT (US)

(72) Inventors: Daniel Vincent Brown, Hamden, CT (US); Rodger W. Bowman, Derby, CT (US); Yuriy Gmirya, Woodbridge, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 13/709,511

(22) Filed: Dec. 10, 2012

(65) Prior Publication Data

US 2014/0158491 A1 Jun. 12, 2014

(51) Int. Cl.
*F16D 7/02* (2006.01)

(52) U.S. Cl.
CPC ........... *F16D 7/025* (2013.01); *Y10T 29/49826* (2015.01)

(58) Field of Classification Search
USPC .................. 464/44, 48; 192/56.6, 66.3, 66.31
See application file for complete search history.

(56) References Cited

U.S. PATENT DOCUMENTS

| | | | | |
|---|---|---|---|---|
| 2,618,136 | A * | 11/1952 | Wellauer | 464/48 |
| 3,090,213 | A * | 5/1963 | Lindgren | 464/48 |
| 3,550,727 | A * | 12/1970 | McCain | 464/48 X |
| 4,373,358 | A * | 2/1983 | Pearch et al. | 464/48 |
| 4,401,426 | A * | 8/1983 | Heidenreich | 464/48 |
| 4,617,003 | A * | 10/1986 | Bober et al. | 464/48 |
| 4,645,472 | A * | 2/1987 | Heidenreich | 464/48 |
| 4,793,120 | A * | 12/1988 | Herzog | 464/48 X |
| 5,020,650 | A * | 6/1991 | Heidenreich et al. | 464/48 |
| 5,129,497 | A * | 7/1992 | Kelley | 464/48 X |
| 5,135,088 | A * | 8/1992 | Heidenreich et al. | 464/48 |
| 5,688,176 | A * | 11/1997 | Heidenreich et al. | 464/48 |
| 6,190,258 | B1 | 2/2001 | Heidenreich et al. | |
| 6,662,922 | B2 * | 12/2003 | Schott | |
| 7,318,403 | B1 | 1/2008 | Huart et al. | |
| 2001/0042811 | A1 * | 11/2001 | Rodrigues | |
| 2002/0148695 | A1 * | 10/2002 | Latsko | |

* cited by examiner

*Primary Examiner* — Gregory Binda
*Assistant Examiner* — Matthieu Setliff
(74) *Attorney, Agent, or Firm* — Cantor Colburn LLP

(57) ABSTRACT

A torque limiting device includes a first portion connected to a first rotatable component. The first portion has a flange extending radially outward therefrom. A second portion includes a plurality of pre-loaded axial springs and is coupled to a second rotatable component. The second portion is arranged adjacent opposing surfaces of the flange. The second portion is configured to apply a biasing force to the flange to selectively couple the first rotatable component and the second rotatable component.

16 Claims, 4 Drawing Sheets though the torque limiting device 30 is illustrated within a propulsion system of a rotary wing aircraft, it is understood that the torque limiting device 30 may be configured for use in other applications, such as in tools or transmission systems for example. A first portion 32 of the torque limiting device 30 is configured to rotate with the drive shaft 10 and a second portion 50 of the torque limiting device is configured to rotate with the PMA rotor 20. In one embodiment, the first portion 32 of the torque limiting device 30 is mounted adjacent the first end 12 of the drive shaft 10. The second portion 50 may be coupled to the PMA rotor in a manner that allows only axial movement of the second portion, such as with a slidable pin. Alternatively, if the second portion 50 is arranged in a reverse orientation, the second portion 50 of the torque limiting device may be press fit to the PMA rotor 20. Though both the first portion 32 and the second portion 50 of the torque limiting device 30 are described as being rotable, other configurations, such as where only one of the first portion 32 and the second portion 50 rotate for example, are within the scope of the invention.

FRICTION CLUTCH FOR SHAFT DRIVEN ACCESSORIES

BACKGROUND OF THE INVENTION

Exemplary embodiments of the invention generally relate to torque limiters, and more particularly, to torque limiters for applications having lower torque limits and tight tolerances.

Propulsion systems of a vehicle, such as a rotary wing aircraft for example, include a permanent magnet alternator (PMA) driven by an engine or turbine through a driving gearbox. The normal drive torque and the maximum torque capability of the driving gearbox are substantially similar and the gearbox must provide the normal drive torque under all operating conditions with little or no potential for failure. Conventional PMAs typically do not include a torque limiting feature to prevent a catastrophic failure in the event that the PMA rotor jams.

When the PMA is replaced in the field, there is an increased possibility of debris or other foreign material entering into the system and affecting the functionality of the system. Consequently, there is a need for a torque limiting device. However, where the system is a propulsion system of rotary wing aircraft, size constraints, large operating temperature range, and relatively small torque limits prevent the use of conventional torque limiting devices, such as keyways and shaft section shearing for example. As a result, a conventional torque limiting device is difficult to implement in such restrictive applications having low torque limits with tight tolerances.

BRIEF DESCRIPTION OF THE INVENTION

According to one embodiment of the invention, a torque limiting device is provided including a first portion connected to a first rotatable component. The first portion has a flange extending radially outward therefrom. A second portion includes a plurality of pre-loaded axial springs and is coupled to a second rotatable component. The second portion is arranged adjacent opposing surfaces of the flange. The second portion is configured to apply a biasing force to the flange to selectively couple the first rotatable component and the second rotatable component.

According to another embodiment of the invention, a system is provided including a drive shaft, a rotor, and a torque limiting device radially nested between the drive shaft and the rotor. The torque limiting device includes a generally hollow bushing having an elongated portion and a flange extending radially outward from an end of the elongated portion. The bushing is arranged adjacent a first end of the drive shaft. A generally hollow cartridge assembly is coupled to the rotor. The cartridge assembly includes a plurality of holes and an axial spring received within each of the plurality of holes. At least one guide pin extends from the cartridge assembly and is received within a clearance hole of an adjacent washer. A retaining ring is positioned adjacent the first washer such that the first washer generates a pre-load in the axial springs. A second washer and the cartridge assembly are positioned adjacent opposing surfaces of the flange and are configured to apply a biasing force to the flange to selectively couple the drive shaft and the rotor.

According to yet another embodiment of the invention, a method for installing a torque limiting device in a system is provided including assembling a first portion of the torque limiting device and a second portion of the torque limiting device. The second portion of the torque limiting device includes at least one biasing mechanism configured to selectively couple the first portion and the second portion. The second portion is then mounted to a first component of the system. The first portion of the torque limiting device is positioned about an end of a drive shaft of the system. The first portion of the torque limiting device is fastened to the end of the drive shaft to prevent axial movement thereof.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
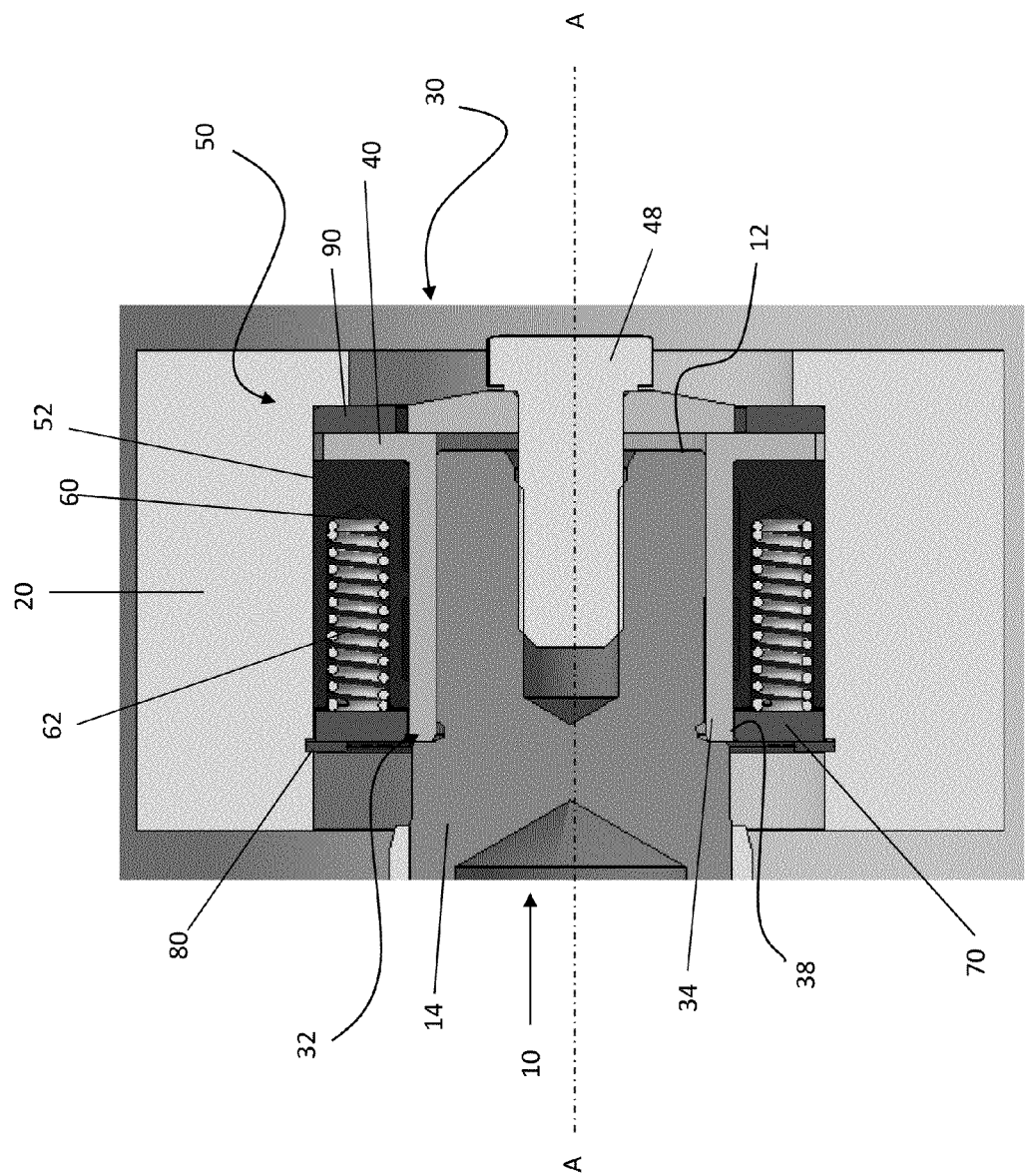
FIG. 1 is a cross-sectional view of a system including a torque limiting device according to an embodiment of the invention.
Figure 1A:
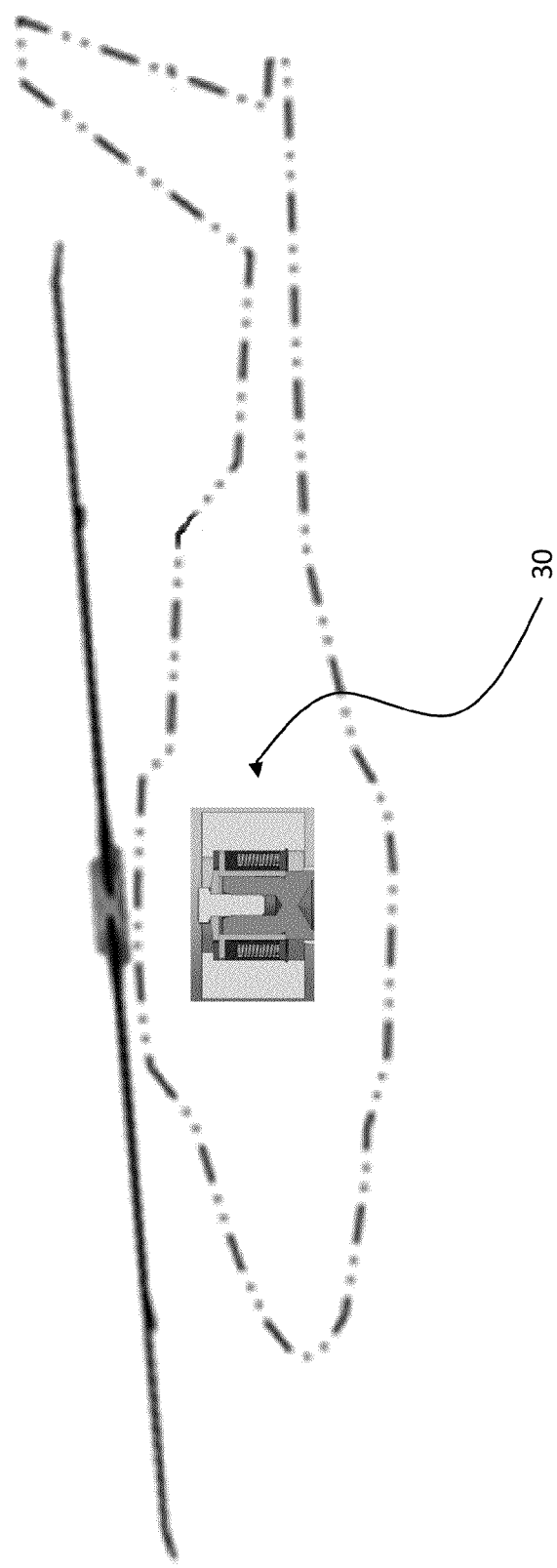
FIG. 1a is a cross-sectional view of a portion of a propulsion system of a rotary wing aircraft according to an embodiment of the invention.

The detailed description explains embodiments of the invention, together with advantages and features, by way of example with reference to the drawings.

DETAILED DESCRIPTION OF THE INVENTION

Referring now to the FIGS., a torque limiting device 30 is nested radially between a first rotatable component 10 and a second rotatable component 20. In the illustrated embodiment, the first rotatable component 10 is a drive shaft and the second rotatable component 20 is the rotor of a permanent magnet alternator (PMA) of a propulsion system of a rotary wing aircraft. Though the torque limiting device 30 is illustrated within a propulsion system of a rotary wing aircraft, it is understood that the torque limiting device 30 may be configured for use in other applications, such as in tools or transmission systems for example. A first portion 32 of the torque limiting device 30 is configured to rotate with the drive shaft 10 and a second portion 50 of the torque limiting device is configured to rotate with the PMA rotor 20. In one embodiment, the first portion 32 of the torque limiting device 30 is mounted adjacent the first end 12 of the drive shaft 10. The second portion 50 may be coupled to the PMA rotor in a manner that allows only axial movement of the second portion, such as with a slidable pin. Alternatively, if the second portion 50 is arranged in a reverse orientation, the second portion 50 of the torque limiting device may be press fit to the PMA rotor 20. Though both the first portion 32 and the second portion 50 of the torque limiting device 30 are described as being rotable, other configurations, such as where only one of the first portion 32 and the second portion 50 rotate for example, are within the scope of the invention.

Figure 3:
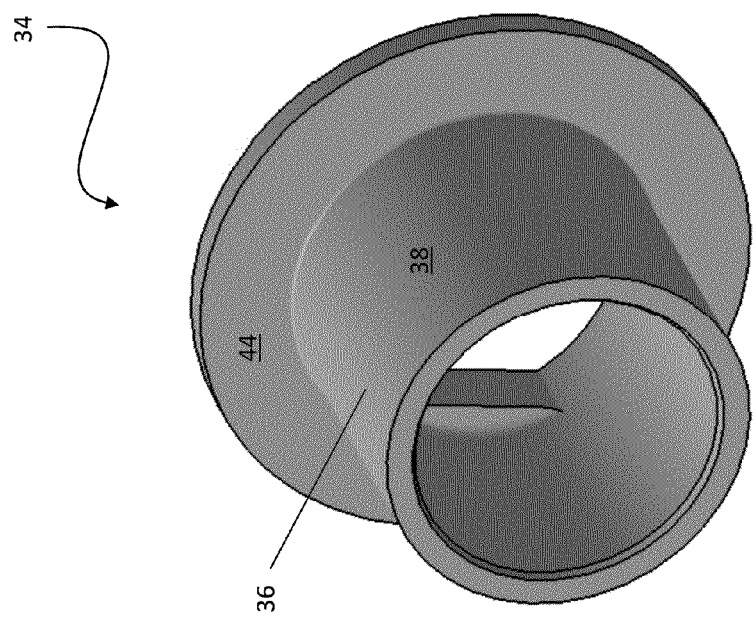
FIG. 3 is an alternate perspective view of a bushing of the torque limiting device according to an embodiment of the invention.
Figure 2:
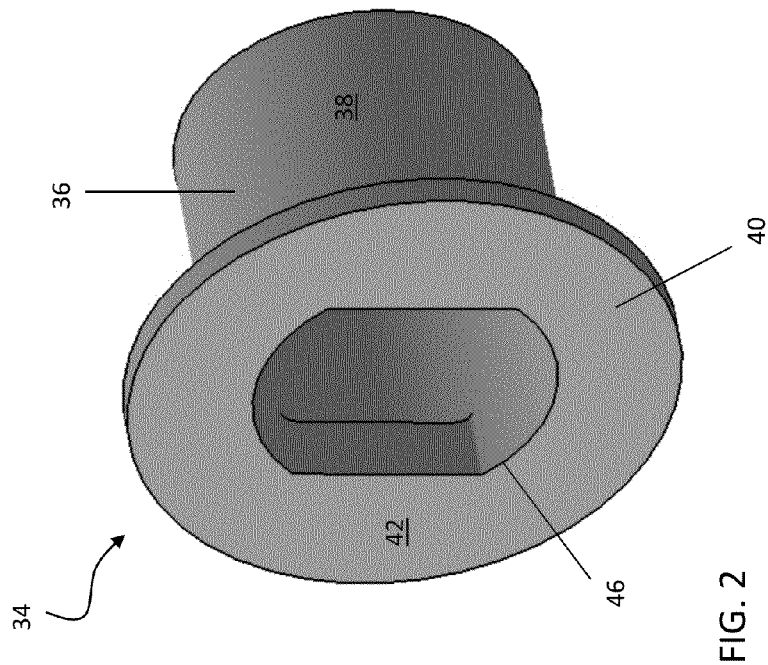
FIG. 2 is a perspective view of a bushing of the torque limiting device according to an embodiment of the invention.

The first portion 32 of the torque limiting device 30 includes a bushing 34. In one embodiment, the bushing 34 is made from a steel material. Referring now to FIGS. 2 and 3, the bushing 34 is provided in more detail. The illustrated bushing 34 includes a generally hollow elongated portion 36. The inner circumference of the elongated portion 36 is substantially equal to an outer circumference of the first end 12 of the drive shaft 10. In one embodiment, the circumference at the first end 12 of the drive shaft 10 is less than the circumference at an adjacent portion 14 of the drive shaft 10 such that when the bushing 34 is installed, the outer surface 38 of the elongated portion 36 of the bushing 34 is substantially flush with the adjacent portion 14 of the drive shaft 10. A flange 40 is integrally formed with an end of the elongated portion 36 of the bushing 34 and extends substantially radially outward therefrom. A torque driving feature 46 is formed at the center of the flange 40. In one embodiment, the torque driving feature 46 is a hole adapted to receive a connector 48 for fastening the bushing 34 to the first end 12 of the drive shaft 10.

Figure 4:
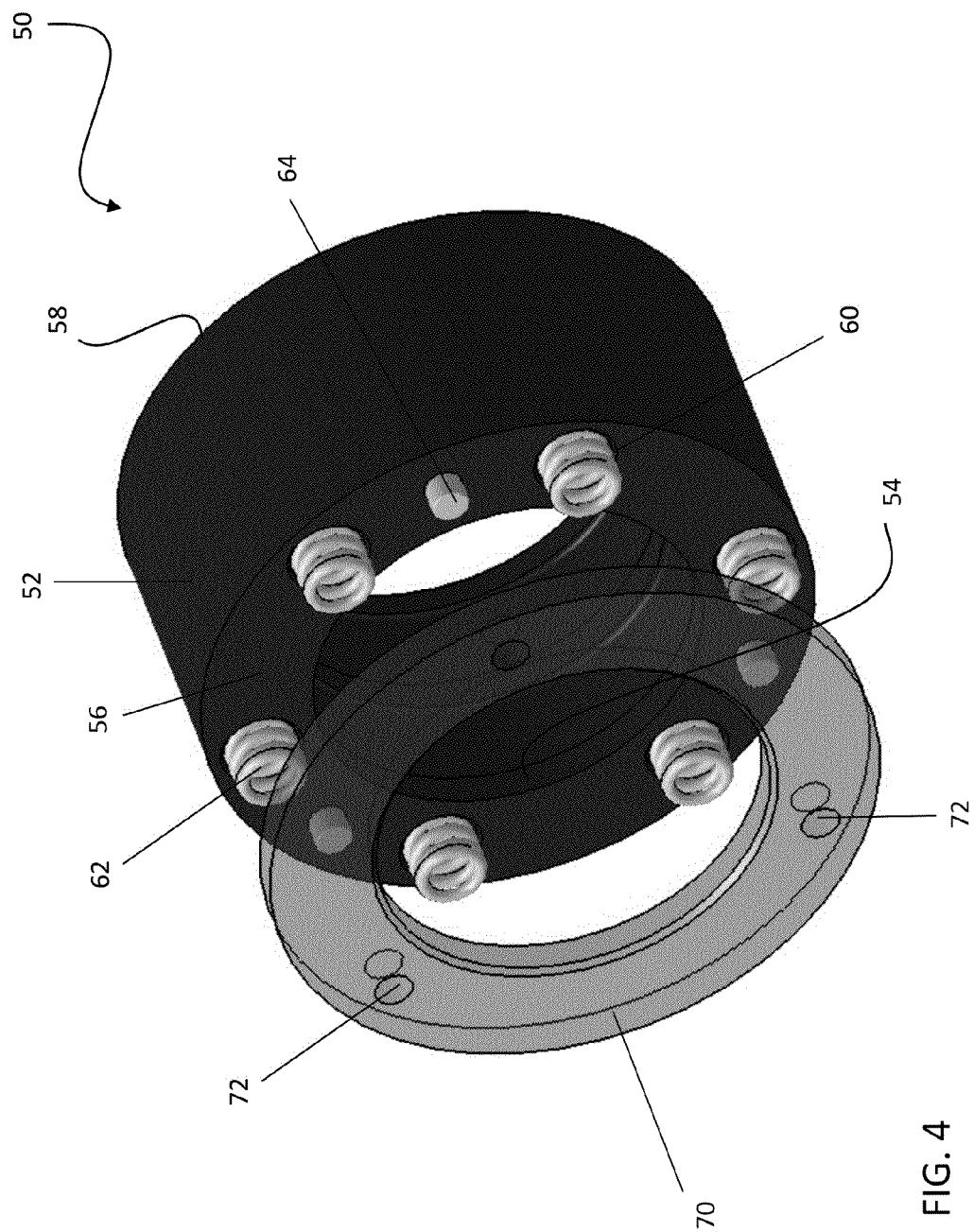
FIG. 4 is a perspective view of a cartridge assembly and first washer of the torque limiting device according to an embodiment of the invention.

Referring now to FIG. 4, the second portion 50 of the torque limiting device includes a cartridge assembly 52 configured to create a biasing force. As shown, the cartridge assembly 52 is generally hollow and has a length substantially equal to the length of the elongated portion 36 of the bushing 34. In addition, the inner surface 54 of the cartridge assembly 52 has a circumference substantially equal to the circumference of the outer surface 38 of the elongated portion 36 of the bushing 34. In one embodiment, the inner surface 54 of the cartridge assembly 52 is configured to rotate relative to the elongated portion 36 of the bushing 34.

Formed within the first end 56 of the cartridge assembly 52 is a plurality of holes 60, each of which receives a substantially identical biasing mechanism 62, such as a spring for example, configured to provide a biasing force to the cartridge assembly 52. Other exemplary biasing mechanisms 62 include hydraulic and pneumatic elements for example. In one embodiment, the cartridge assembly 52 includes at least three biasing mechanisms 62 and corresponding holes 60. The holes 60 extend over only a portion of the length of the cartridge assembly 52 and are equidistantly spaced about the circumference. In one embodiment where the biasing mechanisms 62 are axial springs, the biasing mechanisms 62 have an uncompressed length such that a portion of each biasing mechanism 62 extends past the first end 56 of the cartridge assembly 52 when uncompressed. In addition, at least one guide pin 64 extends outwardly from the first surface 56 of the cartridge assembly 52.

Positioned adjacent the first end 56 of the cartridge assembly 52 is a first washer 70. The first washer 70 includes at least one clearance hole 72 configured to receive the at least one guide pin 64 extending from the cartridge assembly 52. Together, the guide pins 64 and the clearance holes 72 axially align the first washer 70 with the cartridge assembly 52. The first washer 70 is configured to translate along the axis of rotation A of the drive shaft 10 (see FIG. 1) as a result of the biasing force generated by the plurality of biasing mechanisms 62. When the cartridge assembly 52 is installed around the drive shaft 10 and bushing 34, a second end 58 of the cartridge assembly 52 contacts a second surface 44 of the flange 40. A retaining ring 80 is positioned adjacent the first washer 70, opposite the first end 56 of the cartridge assembly 52. The position of the retaining ring 80 is selected to apply a force, opposite the biasing force, to each of the biasing mechanisms 62 such that the biasing mechanisms 62 are therefore considered to have a pre-load. A shim or other spacer (not shown) may be positioned between the first washer 70 and the retaining ring 80 to generate the desired pre-load in the biasing mechanisms 62. Arranged in contact with a second surface 42 of the flange 40, opposite the cartridge assembly 52 is a second washer 90. In one embodiment, both the cartridge assembly 52 and the second washer 90 are manufactured from a bronze material.

During normal operation, a rotational force, or torque, is applied to the drive shaft 10 such that the drive shaft 10 and the first portion 32 of the torque limiting device 30 coupled thereto rotate about an axis A. The biasing force generated by the biasing mechanisms 62 cause the second end 58 of the cartridge assembly 52 and the second washer 90 to engage and apply the biasing force to the opposing surfaces 42, 44 of the flange 40 of the bushing 34. As a result of the frictional force between the second surface 44 of the flange 40 and the cartridge assembly 52 and the first surface 42 of the flange 40 and the second washer 90, the second portion 50 and the first portion 32 of the torque limiting device 30 are coupled. Because the PMA rotor 20 is coupled to the cartridge assembly 52, the PMA rotor 20, torque limiting device 30, and the drive shaft 10 rotate about axis A in unison.

The biasing force generated by the biasing mechanisms 62, as well as the friction coefficient of the cartridge assembly 52 and the second washer 90 are selected to create a desired frictional force. During normal operation, the frictional force prevents slipping of the first portion 32 of the torque limiting device 30 relative to the second portion 50 when the torque applied to the drive shaft 10 is below a predetermined threshold. If the torque on the drive shaft 10 exceeds the threshold, the frictional force is selected to be insufficient to prevent the first portion 32 and the second portion 50 of the torque limiting device 30 from slipping relative to one another such that the first portion 32 and the second portion 50 rotate at different speeds. For example, if an obstruction interferes with the rotation of the rotor 20, causing the rotor 20 to jam for example, the torque on the drive shaft 10 significantly increases. The torque on drive shaft 10 overcomes the frictional force created by the second end 58 of the cartridge assembly 52 and the second washer 90 contacting the flange. As a result, the first portion 32 of the torque limiting device 30 is no longer coupled to the second portion 50, and therefore the drive shaft 10 and bushing 34 rotate relative to the cartridge assembly 52 of the PMA rotor 20.

To install or replace the torque limiting device 30 within the propulsion system of a rotary wing aircraft, the first portion 32 and the second portion 50 are assembled in a coupled arrangement. The torque limiting device 30 is then connected to an interior surface of the rotor 20, such as via one or more pins or a press-fit operation. The torque limiting device 30 and rotor 20 are then positioned within the system by inserting the end 12 of the drive shaft 10 into the bushing 34 of the first portion 32. The first portion 32 of the torque limiting device 30 is then fastened to the end 12 to prevent axial movement thereof. When positioned within the system, the PMA rotor 20 is located adjacent a complementary stator (not shown).

Inclusion of the radially nested torque limiting device 30 prevents the drive shaft 10 from shearing as a result of over-torque in the system. The torque limiting device 30 provides relatively tight control of the torque of the drive shaft 10 while operating within a wide temperature range. Unlike keyways and other conventional devices, the torque limiting device 30 has a small size envelope and allows for factory testing without damage to the device 30. Because the torque limiting device 30 may be tested in the factory, debris and other foreign objects that impede the rotation of the rotor 20 can be detected and removed before the device 20 is installed into a rotary wing aircraft.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotary wing aircraft comprising:
an airframe;
a main rotor system configured to rotate about a first axis;
a propulsion system for driving the main rotor system about the first axis, the propulsion system including a device for limiting a transfer of torque between a first rotatable component and a second rotatable component, the device for limiting a transfer of torque having:
a first portion connected to the first component, the first portion having a flange extending radially outward therefrom; and
a second portion coupled to the second component, the second portion including a cartridge assembly arranged concentrically with at least part of the first portion such that the first portion is arranged between the second portion and the first axis, the second portion having a first end arranged adjacent a first side of the flange and a first washer arranged adjacent a second, opposite side of the flange, a second end of the cartridge assembly having at least one hole including a biasing mechanism arranged therein, the biasing mechanism being configured to bias the first end of the cartridge assembly and the first washer into contact with the flange to transmit torque between the first component and the second component when a torque applied to the first component is below a predetermined threshold.

2. The rotary wing aircraft according to claim 1, wherein when the torque applied to the first rotatable component exceeds the predetermined threshold, the first rotatable component is decoupled from the second rotatable component.

3. The rotary wing aircraft according to claim 2, wherein when the torque applied to the first rotatable component exceeds a threshold, the first portion is decoupled from the second portion.

4. The rotary wing aircraft according to claim 1, wherein the first rotatable component is a drive shaft and the second rotatable component is a rotor.

5. The rotary wing aircraft according to claim 1, wherein the first portion includes a bushing having an elongated portion and the flange is arranged at a first end of the elongated portion.

6. The rotary wing aircraft according to claim 1, wherein the second portion includes a second washer arranged adjacent the second end of the cartridge assembly to compress the at least one biasing mechanism.

7. A rotary wing aircraft comprising:
a drive shaft configured to drive a rotor system of the rotary wing aircraft about a rotational axis;
a rotor of the rotary wing aircraft;
a torque limiting device radially nested between the drive shaft and the rotor, the torque limiting device including:
a generally hollow bushing having an elongated portion and a flange extending radially outward from the elongated portion, the bushing being arranged adjacent a first end of the drive shaft;
a generally hollow cartridge assembly coupled to the rotor, the cartridge assembly being arranged concentrically with the elongated portion of the bushing such that the bushing is disposed between the hollow cartridge assembly and the drive shaft, the cartridge assembly having a first end arranged adjacent a first side of the flange, and a second, opposite end having at least one guide pin extending therefrom and a plurality of holes formed therein, an axial spring being arranged within each of the plurality of holes;
a first washer arranged adjacent the second end of the cartridge assembly and including at least one clearance hole configured to receive the at least one guide pin;
a retaining ring positioned adjacent the first washer such that the first washer generates a pre-load in the axial springs; and
a second washer arranged adjacent a second, opposite side of the flange, the axial springs being configured to bias the first end of the cartridge assembly and the second washer into contact with the flange to transmit torque between the drive shaft and the rotor when a torque applied to the drive shaft is below a predetermined threshold.

8. The rotary wing aircraft according to claim 7, wherein when the torque applied to the drive shaft exceeds the predetermined threshold, the drive shaft is decoupled from the rotor.

9. The rotary wing aircraft according to claim 7, wherein the bushing is connected to the first end of the drive shaft with a fastening device.

10. The rotary wing aircraft according to claim 7, wherein the plurality of axial springs are substantially identical and evenly spaced about a circumference of the cartridge assembly.

11. The rotary wing aircraft according to claim 10, wherein the cartridge assembly includes at least three axial springs and three holes.

12. The rotary wing aircraft according to claim 11, wherein the axial springs are coil springs.

13. The rotary wing aircraft according to claim 7, wherein the rotor is a portion of a permanent magnet alternator.

14. The rotary wing aircraft according to claim 7, wherein the cartridge assembly and the second washer are manufactured from a bronze material.

15. The rotary wing aircraft according to claim 7, wherein the cartridge assembly is configured to slide relative to the bushing when the drive shaft and rotor are not coupled.

16. The rotary wing aircraft according to claim 7, wherein the cartridge assembly is press fit between the rotor and the bushing.

* * * * *